United States Patent
Newton et al.

(10) Patent No.: US 10,764,355 B2
(45) Date of Patent: *Sep. 1, 2020

(54) NETWORK ADDRESS RESOLUTION

(71) Applicant: LEVEL 3 COMMUNICATIONS, LLC, Broomfield, CO (US)

(72) Inventors: Christopher Newton, Westlake, CA (US); William R. Power, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,130

(22) Filed: Jul. 1, 2019

(65) Prior Publication Data

US 2019/0327286 A1 Oct. 24, 2019

Related U.S. Application Data

(63) Continuation of application No. 16/105,877, filed on Aug. 20, 2018, now Pat. No. 10,348,801, which is a continuation of application No. 14/985,968, filed on Dec. 31, 2015, now Pat. No. 10,057,322.

(60) Provisional application No. 62/098,930, filed on Dec. 31, 2014.

(51) Int. Cl.
*H04L 29/08* (2006.01)
*G06F 16/48* (2019.01)
*G06F 16/955* (2019.01)
*H04L 29/12* (2006.01)

(52) U.S. Cl.
CPC .............. *H04L 67/02* (2013.01); *G06F 16/48* (2019.01); *G06F 16/955* (2019.01); *H04L 61/1511* (2013.01); *H04L 61/3055* (2013.01); *H04L 67/1021* (2013.01)

(58) Field of Classification Search
CPC ........................... H04L 67/02; H04L 67/1021
See application file for complete search history.

(56) References Cited

U.S. PATENT DOCUMENTS

| | | | |
|---|---|---|---|
| 6,185,598 B1 | 2/2001 | Farber et al. |
| 6,654,807 B2 | 11/2003 | Farber et al. |
| 7,054,935 B2 | 5/2006 | Farber et al. |
| 7,945,693 B2 | 5/2011 | Farber et al. |
| 7,949,779 B2 | 5/2011 | Farber et al. |
| 8,060,613 B2 | 11/2011 | Farber et al. |

(Continued)

FOREIGN PATENT DOCUMENTS

GB 2494027 2/2013

OTHER PUBLICATIONS

Chinese First Office Action, dated Dec. 25, 2019, Application No. 2015800719421, filed Dec. 31, 2015; 23 pgs.

(Continued)

*Primary Examiner* — Lashonda T Jacobs

(57) ABSTRACT

A content delivery method, and related apparatus, that involves the operations of receiving a request for a content resource including at least one embedded resource with a tag. Upon identification of the tag, using at least one delivery parameter to generate a modified embedded resource. Embedding the modified embedded resource in a content resource, such as an HTML document. Delivering, such as in response to request from a browser, the content resource with the modified embedded resource.

20 Claims, 6 Drawing Sheets

(56) References Cited

U.S. PATENT DOCUMENTS

| | | | |
|---|---|---|---|
| 8,250,211 B2 | 8/2012 | Swildens et al. | |
| 8,281,035 B2 | 10/2012 | Farber et al. | |
| 8,291,046 B2 | 10/2012 | Farber et al. | |
| 8,296,396 B2 | 10/2012 | Farber et al. | |
| 8,412,823 B1* | 4/2013 | Richardson | H04L 67/2852 |
| | | | 709/225 |
| 8,463,877 B1* | 6/2013 | Richardson | H04L 67/02 |
| | | | 709/219 |
| 8,468,245 B2 | 6/2013 | Farber et al. | |
| 8,473,613 B2 | 6/2013 | Farber et al. | |
| 8,478,903 B2 | 7/2013 | Farber et al. | |
| 8,572,208 B2 | 10/2013 | Farber et al. | |
| 8,572,210 B2 | 10/2013 | Farber et al. | |
| 8,683,076 B2 | 3/2014 | Farber et al. | |
| 8,756,341 B1* | 6/2014 | Richardson | H04L 67/42 |
| | | | 709/245 |
| 9,154,551 B1* | 10/2015 | Watson | H04L 67/2814 |
| 9,191,458 B2* | 11/2015 | Richardson | H04L 61/1511 |
| 9,787,599 B2* | 10/2017 | Richardson | H04L 47/70 |
| 9,794,216 B2* | 10/2017 | Richardson | H04L 29/12066 |
| 9,800,539 B2* | 10/2017 | Richardson | H04L 67/00 |
| 2003/0204529 A1* | 10/2003 | Hertling | G06F 16/9574 |
| 2007/0006155 A1* | 1/2007 | Maennel | G06F 11/3664 |
| | | | 717/124 |
| 2008/0086574 A1* | 4/2008 | Raciborski | H04L 61/1511 |
| | | | 709/245 |
| 2009/0254661 A1* | 10/2009 | Fullagar | H04N 21/25891 |
| | | | 709/226 |
| 2012/0066360 A1* | 3/2012 | Ghosh | H04L 43/0864 |
| | | | 709/223 |
| 2012/0198043 A1* | 8/2012 | Hesketh | H04L 67/2842 |
| | | | 709/223 |
| 2013/0086358 A1 | 4/2013 | Archer | |
| 2014/0053237 A1* | 2/2014 | Hopen | H04L 45/14 |
| | | | 726/1 |
| 2014/0059208 A1* | 2/2014 | Yan | H04L 43/16 |
| | | | 709/224 |
| 2014/0068005 A1* | 3/2014 | Rosenfield | G06F 16/9574 |
| | | | 709/219 |
| 2014/0244605 A1 | 8/2014 | Donis et al. | |
| 2014/0280479 A1* | 9/2014 | Kazerani | H04L 65/602 |
| | | | 709/203 |
| 2014/0289319 A1* | 9/2014 | Richardson | H04L 67/327 |
| | | | 709/203 |
| 2014/0344425 A1* | 11/2014 | Varney | H04L 41/509 |
| | | | 709/221 |
| 2015/0222681 A1 | 8/2015 | Basile | |
| 2016/0191455 A1 | 6/2016 | Newton et al. | |
| 2017/0195447 A1* | 7/2017 | Panagos | H04L 67/2814 |
| 2018/0359304 A1 | 12/2018 | Newton et al. | |

OTHER PUBLICATIONS

European Examination Report, dated Mar. 19, 2019, Application No. 15876352.4, filed Dec. 31, 2015; 4 pgs.

Extended European Search Report, dated Jul. 5, 2018, Application No. 15876352.4, filed Dec. 31, 2015; 5 pgs.

International Preliminary Report on Patentability dated Jul. 4, 2017, Int'l Appl. No. PCT/US15/068284, Int'l Filing Date Dec. 31, 2015; 9 pgs.

International Search Report dated Mar. 14, 2016, Int'l Appl. No. PCT/US15/068284, Int'l Filing Date Dec. 31, 2015; 3 pgs.

Singapore Invitation to Respond to Written Opinion, dated Jan. 7, 2019, Application No. 11201705147U, filed Dec. 31, 2015; 6 pgs.

Singapore Written Opinion, dated Feb. 2, 2018, Application No. 11201705147U, filed Dec. 31, 2015; 6 pgs.

Written Opinion of the International Searching Authority dated Mar. 14, 2016, Int'l Appl. No. PCT/US15/068284, Int'l Filing Date Dec. 31, 2015; 7 pgs.

* cited by examiner

NETWORK ADDRESS RESOLUTION

RELATED APPLICATIONS

This application is a continuation of and claims priority of U.S. application Ser. No. 16/105,877, now U.S. Pat. No. 10,348,801, titled "NETWORK ADDRESS RESOLUTION", filed on Aug. 20, 2018, which is a continuation of and claims priority of U.S. application Ser. No. 14/985,968, now U.S. Pat. No. 10,057,322, titled "NETWORK ADDRESS RESOLUTION", filed Dec. 31, 2015, which claims the benefit and priority of U.S. Application No. 62/098,930, titled "NETWORK ADDRESS RESOLUTION", filed Dec. 31, 2014, the entire contents of which are fully incorporated by reference herein for all purposes. To the extent appropriate, a claim for priority is made to each of the above-referenced applications.

TECHNICAL FIELD

Aspects of the present disclosure relate to network address resolution, and particularly involve introduction of an application programming interface into the resolution stream to embed link resolution information within an HTML document or other content returned to a requesting client.

BACKGROUND

The Internet and the World Wide Web (the "Web") have become ubiquitous. Thousands or even tens of thousands of content providers (publishers) now use the Internet (and, particularly, the Web) to provide all sorts of content to numerous clients all over the world. In order to offload the job of serving some or all of their content, many content providers now subscribe to content delivery networks (CDNs). Using a CDN, content can be served to clients from the CDN (e.g., from one or more servers in the CDN) instead of from the content provider's server(s). In a caching CDN, content may also be cached on some or all of the CDN servers, either before being served or in response to specific requests for that content. Having content cached within edge servers of the CDN enhances the performance of the CDN because the content does not have to be retrieved from mid-tier servers origin servers or other locations, which are less efficient than edge servers in providing content.

Content is constantly being accessed from networks. For example, television shows and movies may now be accessed from any number of Web sites. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once only provided on disc and mailed to recipients, are now routinely distributed to devices using only network connections. All of these forms of content may be distributed using CDNs.

It is with these observations in mind, among others, that various aspects of the present disclosure were conceived and developed.

SUMMARY

Embodiments of the present disclosure involve a content delivery method including the operations of receiving a request for a content resource including at least one embedded resource with a tag. Upon identification of the tag, using at least one delivery parameter to generate a modified embedded resource. And, delivering the content resource with the modified embedded resource.

Embodiments may also include a content delivery device comprising at least one processor in communication with a non-transitory computer readable medium including computer readable instructions for generating an application programming interface (API). At the API, receiving an embedded resource and at least one parameter associated with the embedded resource. The instructions may further include generating a modified embedded resource providing information as to a location within a content delivery network for obtaining the embedded resource.

Embodiments may also include a non-transitory computer readable media comprising an object document, such as an HTML document, comprising at least one embedded resource, the at least one embedded resource including a tag that causes the embedded resource to analyzed to construct a modified embedded resource to replace the embedded resource, the modified embedded resource causing a browser receiving the document with the modified embedded resource to initiate communication with a content delivery network to obtain content associated with the embedded resource.

Finally, embodiments may also include a content delivery method comprising initiating an HTTP connection with a server, the HTTP connection including a client IP address that is available to the server. Receiving an HTML document including at least one embedded resource, the embedded resource including a reference to a content delivery network whereby the reference to the content delivery network is influenced by the client IP address. And, using the reference, initiating a request directly to the content delivery network to obtain content associated with the at least one embedded resource.

These and other embodiments are discussed in more detail below.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters may refer to the same parts throughout the different views. The drawings depict only typical embodiments of the present disclosure and, therefore, are not to be considered limiting in scope.

DETAILED DESCRIPTION

Aspects of the present disclosure involve systems and methods for selecting an edge server, rack, cluster or other device, which may be in a content delivery network (CDN), to serve content to a client. Aspects of the present disclosure involve an alternative to using conventional domain name system (DNS) servers for edge selection by instead calling an API or otherwise querying the CDN when constructing a uniform resource locator (URL) for the resource to be delivered from the CDN. The API call may include a name of the resource, a location of the client requesting the resource and/or an IP address for the client which may be used to determine the location of the client, and/or the popularity of the resource being requested (or embedded within a resource). The API or other computing engine associated therewith generates a target or list of targets (nodes capable of serving the content from the CDN), and provides one or more locations from which the content (or embedded content) may be served. In one particular form, the API may return one or more virtual IP addresses (VIPs) for one or more clustered edge servers. The API may also return the protocol to use for requesting the content. The API may also return a list of absolute URL's from which the content may be retrieved, and/or a list of hostnames and/or IP addresses that could be used to construct the URLs at the calling application.

The term "content" as used herein means any kind of data, in any form, regardless of its representation and regardless of what it represents. The term "content" may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content.

Figure 1:
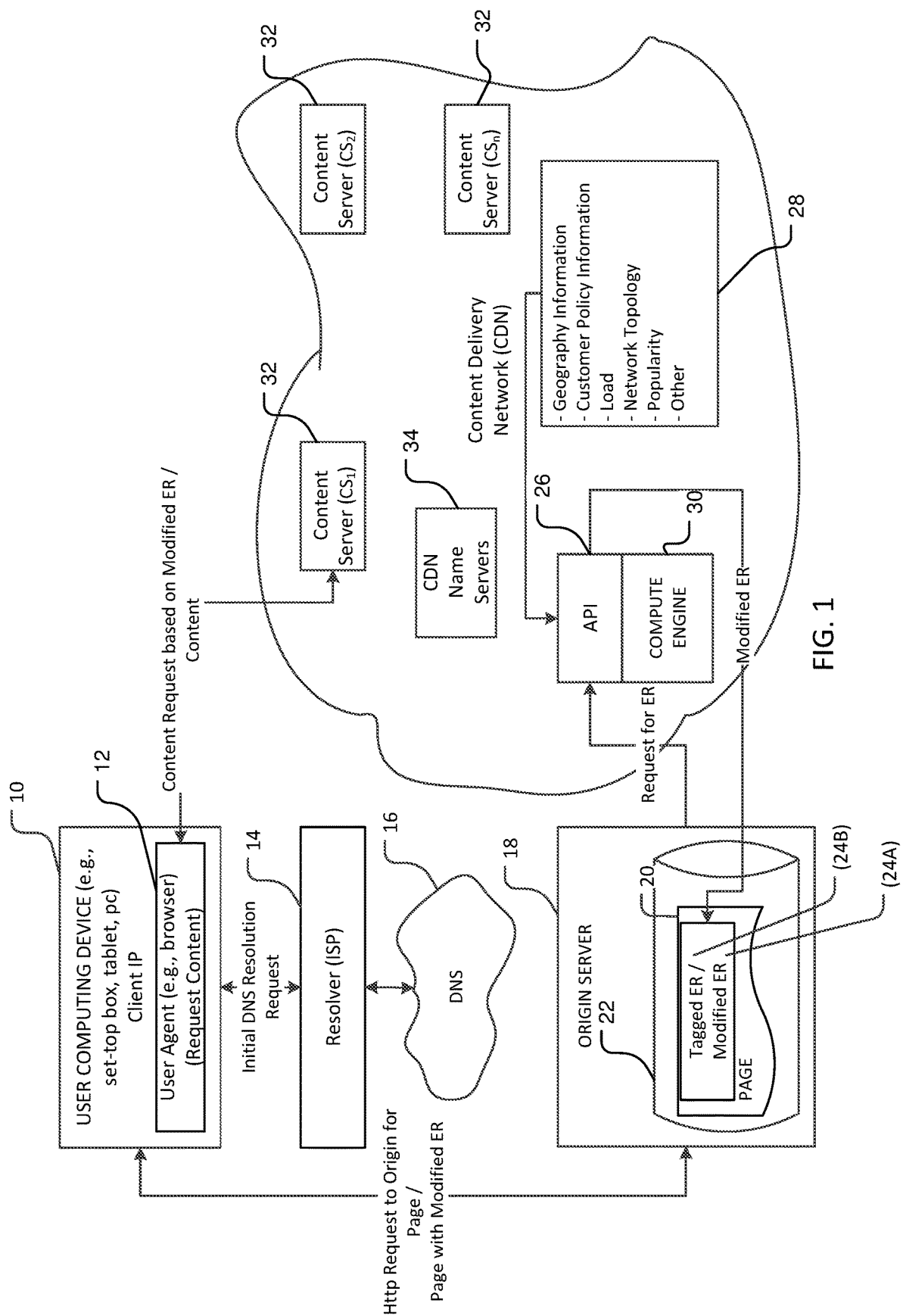
FIG. 1 is a network diagram and message flow related to generating an embedded resource for inclusion in a network asset, such as an HTML document, the embedded resource providing a connection to a node of a CDN bypassing DNS, in one example.
Figure 2:
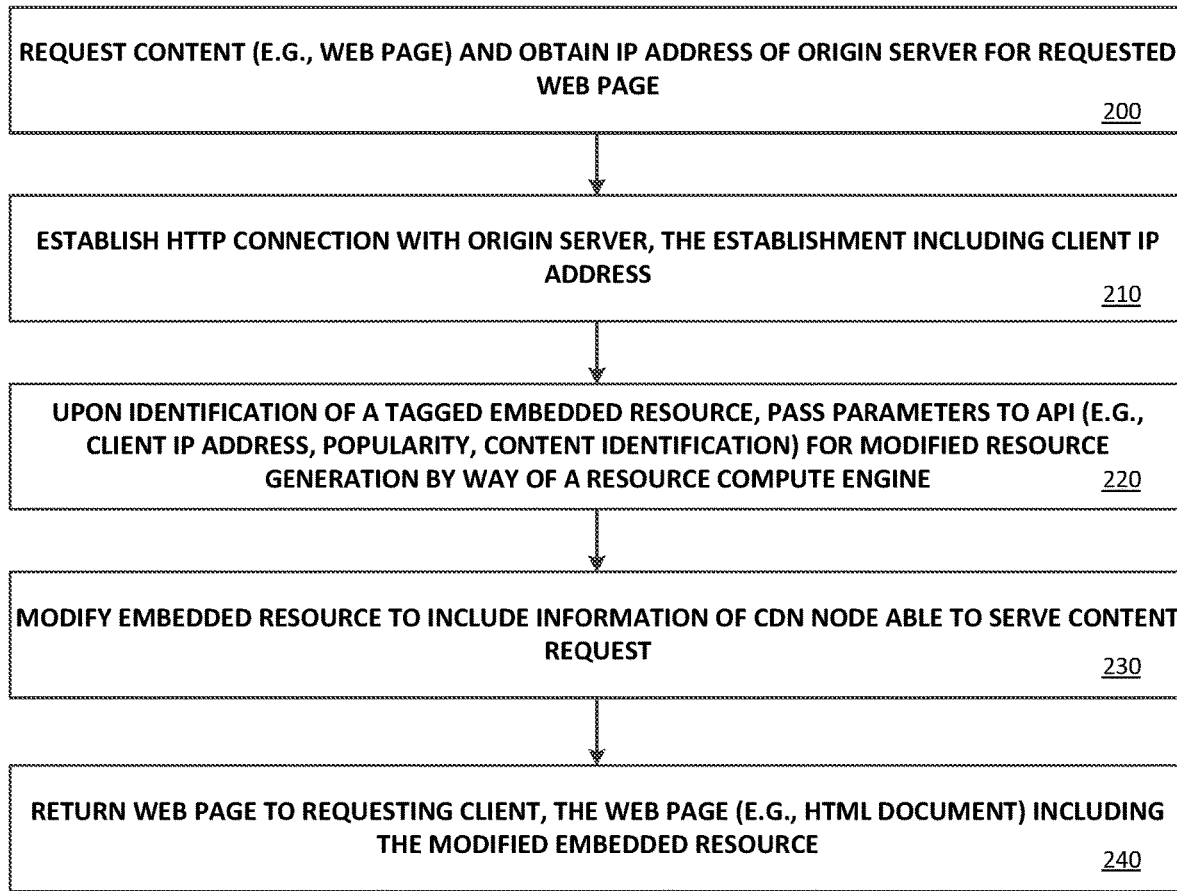
FIG. 2 is a flow diagram illustrating a method of identifying a tagged resource and thereafter providing a modified embedded resource by passing various parameters to an API for identification of a node of a CDN able to serve content associated with the embedded resource.
Figure 3:
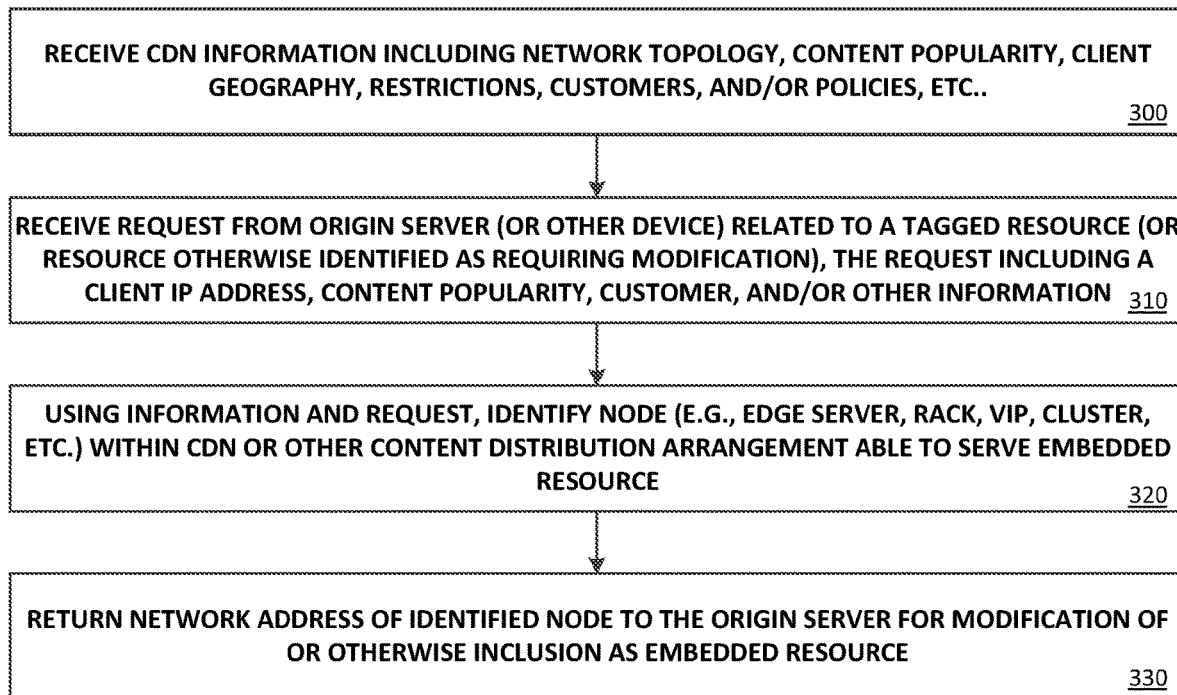
FIG. 3 is a flow diagram illustrating a method of generating a modified resource for embedding in a requested asset having a tagged resource.

FIG. 1 illustrates one example network configuration for practicing aspects of the present disclosure, while FIGS. 2 and 3 describe methods. The illustrated network would include many other components involved in servicing a request and providing content; however, the diagram here focuses on only some components involved in the system and one of ordinary skill will readily understand other conventional components within the network. With respect to content delivery, in this example a request originates from a computing device 10 operating a user agent 12, such as a browser. The computing device may be some form of computing device such as personal computer, a thin client, a tablet, a smart phone, a set-top box, a cable box, or the like, which is capable of running a browser and providing a user with the ability to request content over a network connection, or some other application suitable for interacting with a network and requesting content therefrom. The user device may be a consumer device deployed in a public network, may be an enterprise device deployed in a private network, or may be some other type of device. The network connection, in many instances, will be provided by an Internet service provider (ISP) operating one or more resolvers 14. A resolver (also referred to as a DNS resolver) is a client-side device used to resolve a network address (e.g., translate a domain name into an IP address) for a requested resource. Generally speaking, the resolver contacts (e.g., queries) a DNS infrastructure 16, which may involve many different components, to resolve a network address for a resource (operation 200).

To illustrate aspects of the disclosure, consider when a user enters, into the browser Web page, an address http://www.example.com. The browser 12 contacts the resolver 14, which in turn requests the internet protocol (IP) address for the Web page from DNS 16. DNS returns the IP address of an origin server 18 capable of delivering a hypertext markup language (HTML) document 20 that will render the Web page in the browser. In order to obtain the HTML document, the client device establishes a TCP connection, which may encapsulate an HTTP protocol communication, with the origin server 18 (operation 210). An origin server is a device (or collection of devices) maintaining original copies of content for distribution to client's and/or distribution of copies of content to other nodes. While the present disclosure is illustrated in association with a connection to an origin server, the connection may instead be made with some other device designated in DNS to serve the requested resource. In this example, the origin server is connected with a database 22, which organizes and manages stored resources in some form of storage device (or devices), such as a storage appliance, that includes the HTML document 20 with an embedded resource 24. The HTML document is what the browser uses to display the Web page http://www.example.com/. In this example, the embedded resource 24A is a link to some form of content that the user can obtain by selecting the link when the Web page is displayed.

The embedded resource may include a tag indicating that a resource address compute engine 30 should be contacted via a call to an API 26 (operation 220). For instance, the HTML document may include an embedded resource of the form:

http://${CALLAPI:ADDRONLY}/path/resource.txt, or
${CALLAPI:F'ULLURL,path=$ENV{PATH},
   pop=$POP}.

In both instances, the tag is "$" which causes the origin server 18 to call the API 26 to retrieve the address (only) or the complete URL. Hence, the presence of the tagged resource 24A in the HTML document 20 at the origin servers causes the origin server to call the API, the result of which causes the HTML document returned to the requesting client to include a modified embedded resource 24B with an address or URL to the CDN whereby the content may be retrieved.

When the origin server receives the request (or at some time prior to receiving the request), the origin server calls an API in order to communicate with the compute engine 30 to format the address for the embedded resource. The presence of the tagged embedded resource prompts the API call. In this example, the address for the embedded resource is not static. Instead, an address that is optimally suited to serve the content to the requesting client is returned. So, in a simple example, the HTML document is initially published with a tagged embedded resource 24A that would identify the resource, and may also include other attributes such as popularity. If the user were in New York, which may be determined by including the requesting client's IP address or information, such as geographical information, based on the client IP address in the API call, and the CDN is capable of serving the requested content from both California and New York, it may not be optimal to serve the content from California due to any number of reasons including cost, latency, quality, optimal CDN use, and the like. In the present system, the API/compute engine may instead cause the creation of an embedded resource 24B (also referred to as a modified embedded resource) that will direct the client to the New York node. While described herein as an API call (or calls) in conjunction with an associated compute engine, other applications may be used to compute and return the modified embedded resource. In some instances, only an API is referenced but it should be recognized that such reference includes not only the interface but also the associated compute routine, function, and the like for processing inputs to the API and generating a modified embedded resource. In any event, a modified embedded resource is generated and substituted for the resource, where the modified resource identified a node able to serve the content (operation 230).

The API may obtain information used in determining the address from various sources. To begin, the request from the origin server may include information. Since the client has contacted the origin server over a TCP connection, the client IP address may be included in the request from the client. Accordingly, the origin server may transmit the client IP address to the API and/or the origin server may use the client IP to obtain or generate information 28 to share with the API. For example, the origin server may obtain geographic information for the client, based on the client IP address, or may transmit the IP address to the API, which may obtain geographic information for the client. The location of the client may be used in selecting an optimal node to serve a request for the embedded resource. Note, by embedding an IP address to serve the content directly, the client device may bypass DNS and instead connect directly to the source of the embedded resource. Regardless, the HTML document 20 with the modified imbedded resource 24B is returned to the client device (operation 240).

The origin server, or other devices associated with the customer managing the origin server, may also obtain popularity information for the content. For example, consider the case where http://www.example.com/ is the home page for an on-line video provider and the embedded resource is for a recently released movie that did well in theaters. In such an example, when the movie is released by the video provider, it may initially be quite popular, and this popularity may be tracked and shared with the API (and its compute engine). In the same example, the customer may preset the popularity to "high," for example, based on its understanding that the initial release of the video will be highly popular among its subscribers (user base). The scale of popularity may be in any number of possible forms—1=low, 2=medium, 3=high, scale of 1-10 with 1 being unpopular and 10 being the most popular, etc. The customer defined popularity may be included in the tagged embedded resource of the HTML page as initially defined at the origin or may be provided as a separate input to the API. The scale may be based on the number of requests for the content, which may be based on discrete times (e.g., number of requests per day, per minute, per second, etc.). Finally, popularity may be predicted, and may also be regionalized. For example, a resource in the case of a news story may initially become popular in some particular region or at some particular time. Say, for example, an early morning national breaking news story may become actually popular on the East Coast of the United States. The customer may then predict its popularity on the West Coast and the system may automatically set it to a "high" value for all requests.

Besides client information, including geography, and popularity, the origin server may also pass other information such as policy information, political information, restrictions, etc. For example, the distribution of some content may be geographically limited—e.g., obtaining real-time sporting content may be limited in the geographic area of one or both teams participating in the event. Some content may have geopolitical distribution restrictions. This information may also be stored separately at the CDN or otherwise separately accessible by the CDN and passed to or otherwise used in generating the modified embedded resource. Regardless, referring to FIG. 3, the compute engine receives CDN information, as well as other information, it may use to identify a node, collection of nodes, VIP, or the like, capable of receiving the content (operation 300).

Similar information may be provided to the API or accessible by the API from other sources. The CDN, for example, may maintain its own popularity information and may track the same, which may account for requests originating with other customers of the CDN. It is often the case that a CDN will have numerous customers, and handle some or all content delivery for those customers. Further, in many instances, customers will have Web properties with the same content. Accordingly, clients may contact any of those Web properties to obtain the content. Hence, the CDN has a larger view of the popularity of some content.

In any event, the API 26 provides the interface to a computing engine 30 that uses the information, passed to the engine through the API, to determine one or more nodes 32 in the CDN to serve the content upon receiving a request from the origin server (or from some other request source) related to a tagged resource, or resource otherwise identified for modification (operation 310). The computing engine may take into account and use client IP, customer (through, for example a customer ID), popularity in some or all forms, the delivery protocol of the resource, and the various other forms of information in determining the node from which to serve the content (operation 320). For example, the computing engine may use geographical information to pick the node (CS1) closest to the client to serve the content. The computing engine may further take into account network traffic, and if the closest node is too busy, then select another node (e.g., CS2) that is close but less busy. The computing engine may further embed an instruction, along with the IP address, for the node to cache a copy of the content should the content meet some popularity threshold, and likely be requested again. In some instances, for example, the node may not yet have the content, and upon receiving the request, have to request the content from an origin server, another node, or elsewhere. In such instances, the instruction would cause the node to cache and retain the content and be able to directly serve the next request.

The API returns an absolute URL from which the content may be retrieved, and/or a list of hostnames and/or IP addresses that could be used to construct the URLs at the calling application (operation 330). Similarly, the origin server may pass the document to the API, and the API causes the modified embedded resource to be directly embedded and return the modified document to the origin server. Thus, when the client browser displays the Web page, for example, the modified embedded resource (e.g., link) may include an absolute URL for a node (e.g., edge server(s)) within the CDN that can deliver the content. When the user selects the link, the browser will directly contact the node for the content. In the case of a hostname, the embedded resource may include specific reference to the CDN such that name servers 34 of the CDN are contacted directly, bypassing any other DNS processing such that the CDN may perform any form of intelligent traffic management (ITM) or other forms of edge selection and return an IP address of a node within the CDN able to process the request. It may be the case that the hostname will also include a reference to a node capable of serving the request as determined by the API. In such a case, the hostname references a CDN location as is closely tailored to a location for serving the request but allows for some level of fail over, load balancing, or the like, relative to an absolute URL. In such a case, the hostname may be mapped to a VIP associated with various machines capable of serving the request.

In an alternative implementation, which may also involve an API and calling the same in order to resolve an optimal node to serve a request, the process of contacting the API and constructing the optimal network address is instead handled by the CDN and does not necessarily involve a customer origin server or other devices outside the CDN. While embodiments are discussed herein as involving an API, it should be noted that an API is a convenient and efficient way for disparate systems to uniformly and predictably pass information to the computing engine and for the computing engine to return information. However, other forms of communicating with and passing information to the computing engine are also possible. Moreover, the API may include the functionality of the engine and not necessarily be considered a discrete mechanism from the computing engine functions.

Figure 4:
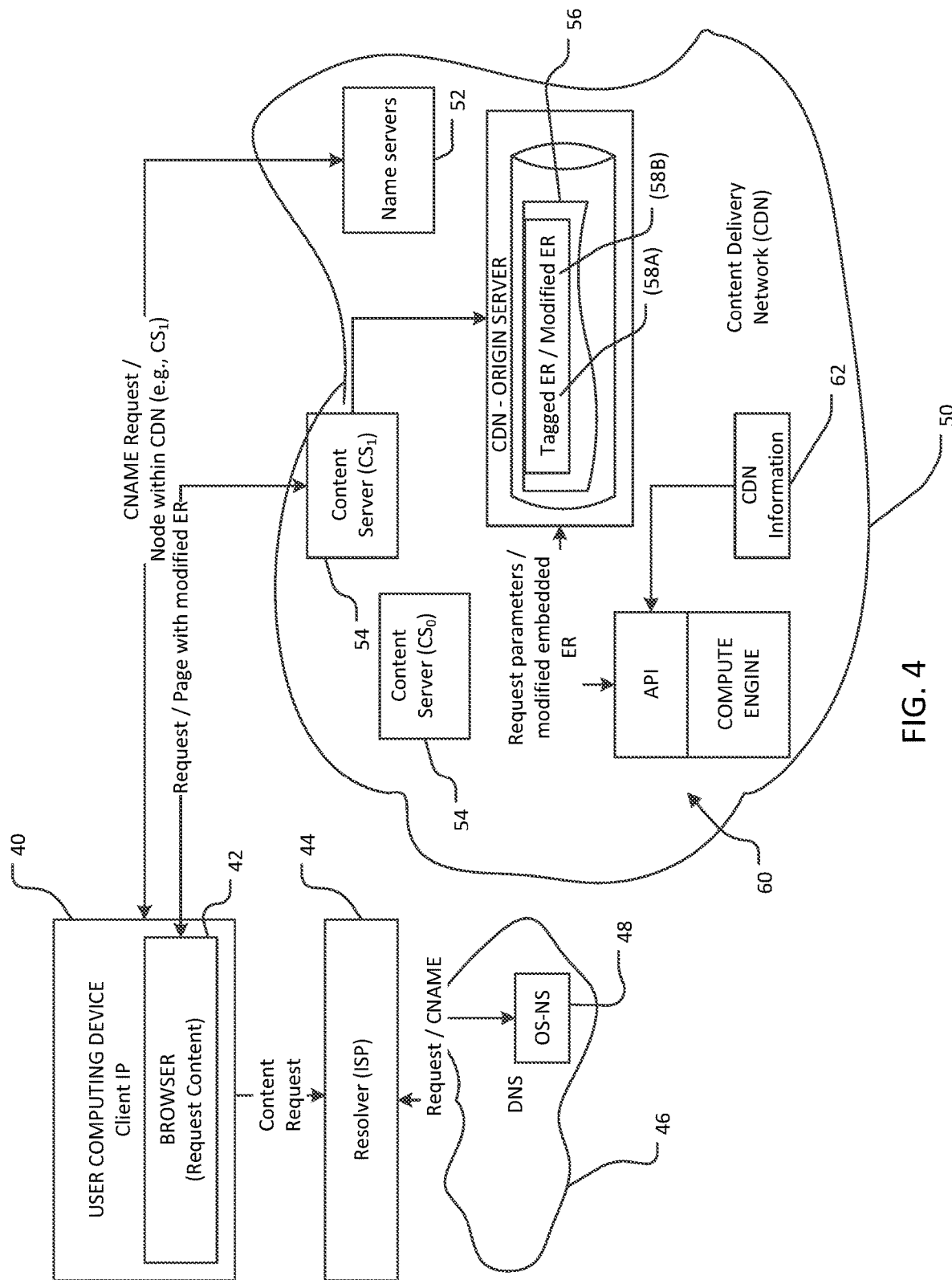
FIG. 4 is a network diagram and message flow related to generating an embedded resource from within a CDN for inclusion in a network asset, such as an HTML document, the embedded resource providing a connection to a node of the CDN bypassing DNS, in one example.
Figure 5:
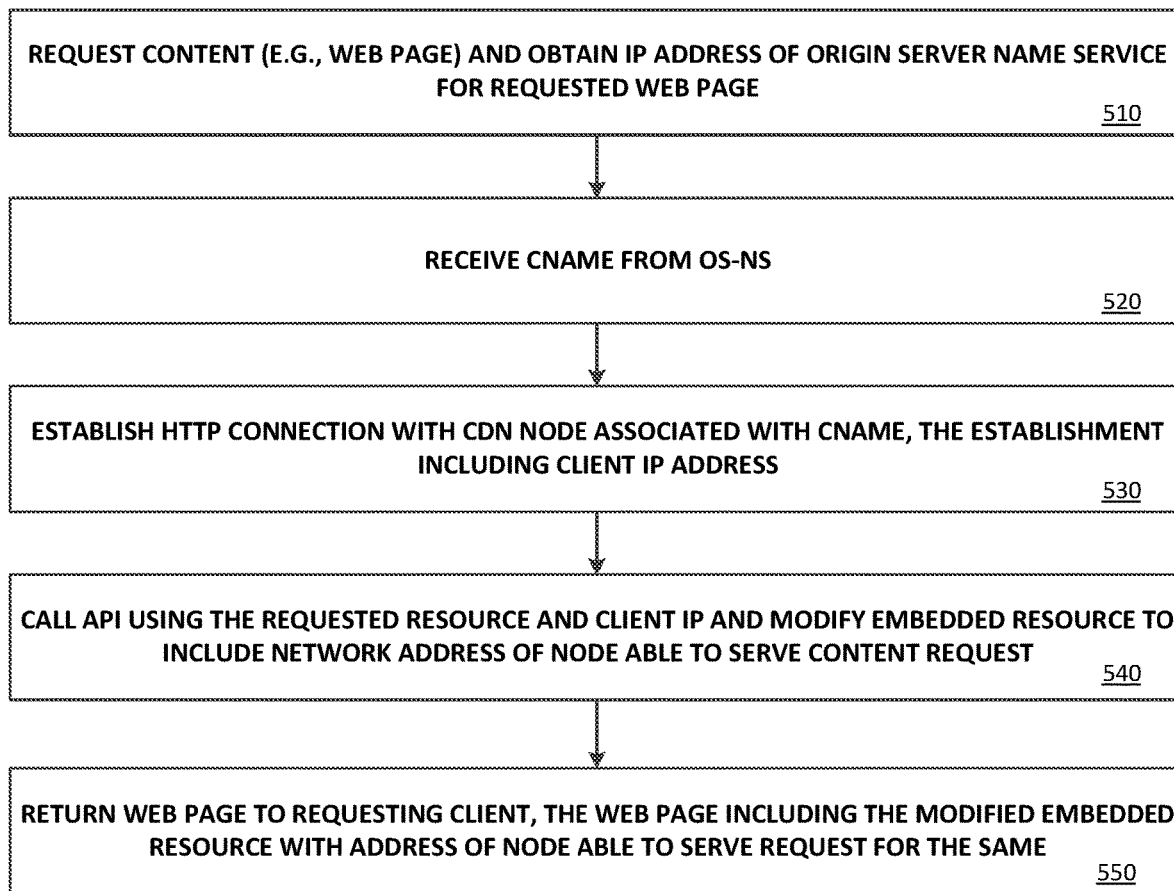
FIG. 5 is a flow diagram illustrating a method of identifying a tagged resource and thereafter providing a modified embedded resource by passing various parameters to an API within a CDN, the API for identification of a node of a CDN able to serve content associated with the embedded resource.

Referring now to FIGS. 4 and 5, in the same manner as the system and process of FIGS. 1-3, a client device 40 makes an initial request for a network resource using a browser 42, which request is received (operation 510) For example, the client requests http://www.example.com. The client's resolver 44 queries DNS 46, which returns a CNAME from an origin server-name service (OS-NS) 48 associated with the requested content (operation 520). A CNAME is a mechanism used in DNS to specify the name or address of another domain. In this case, the CNAME points to the domain of the CDN 50—e.g., www.example.com.c.cdn.net. In such a case, the client device (or other accessing device) will seamlessly be directed to contact the name server 52 or servers for the cdn.net domain. The name server will resolve the request and return an entry point to the CDN, e.g., a node 54, from which to obtain the page 56. Regardless, however, of how the client is directed to the CDN, like the example above, the request to the CDN from the client device may involve an HTTP connection and may include the IP address of the requesting device (client IP) and information as to the requested page (operation 530). The page (e.g., www.example.com) has one or more embedded resources, which may be tagged resources 58A as discussed above. Hence, the CDN node (e.g., an edge server or the CDN origin server) contacted for the page will recognize the presence of a tagged embedded resource 58A and contact the API/compute node 60 to return an embedded resource (referred to as the "modified embedded resource") 58B to include in the page returned to the requesting client device 40 (operations 540 and 550).

The API/compute engine will have access to various types of information from various possible sources. For example, as discussed above, the API may be passed information and may receive information from other sources, which information can be used by the compute engine to generate an address for an embedded link within the page. The page and embedded link (e.g., link to resource) are returned to the requesting client. In one possible example, the embedded resource may include a VIP or a direct link to an edge server to deliver the resource. The compute engine may take into account the location of the client resolver, the location of the client (based on client IP), policy, popularity as tracked by the CDN or included in the original embedded resource, geography restrictions, protocol, and other parameters, when generating the modified embedded resource 58B, which information may be stored, computed or otherwise accessed from a CDN information store 62. Accordingly, when the page 56 (e.g., the HTML document) is returned to the client device 40, and the modified embedded resource 58B is selected, the client device (e.g., browser) may directly contact the node as defined by the API/compute engine or otherwise contact the CDN to obtain the resource.

Figure 6:
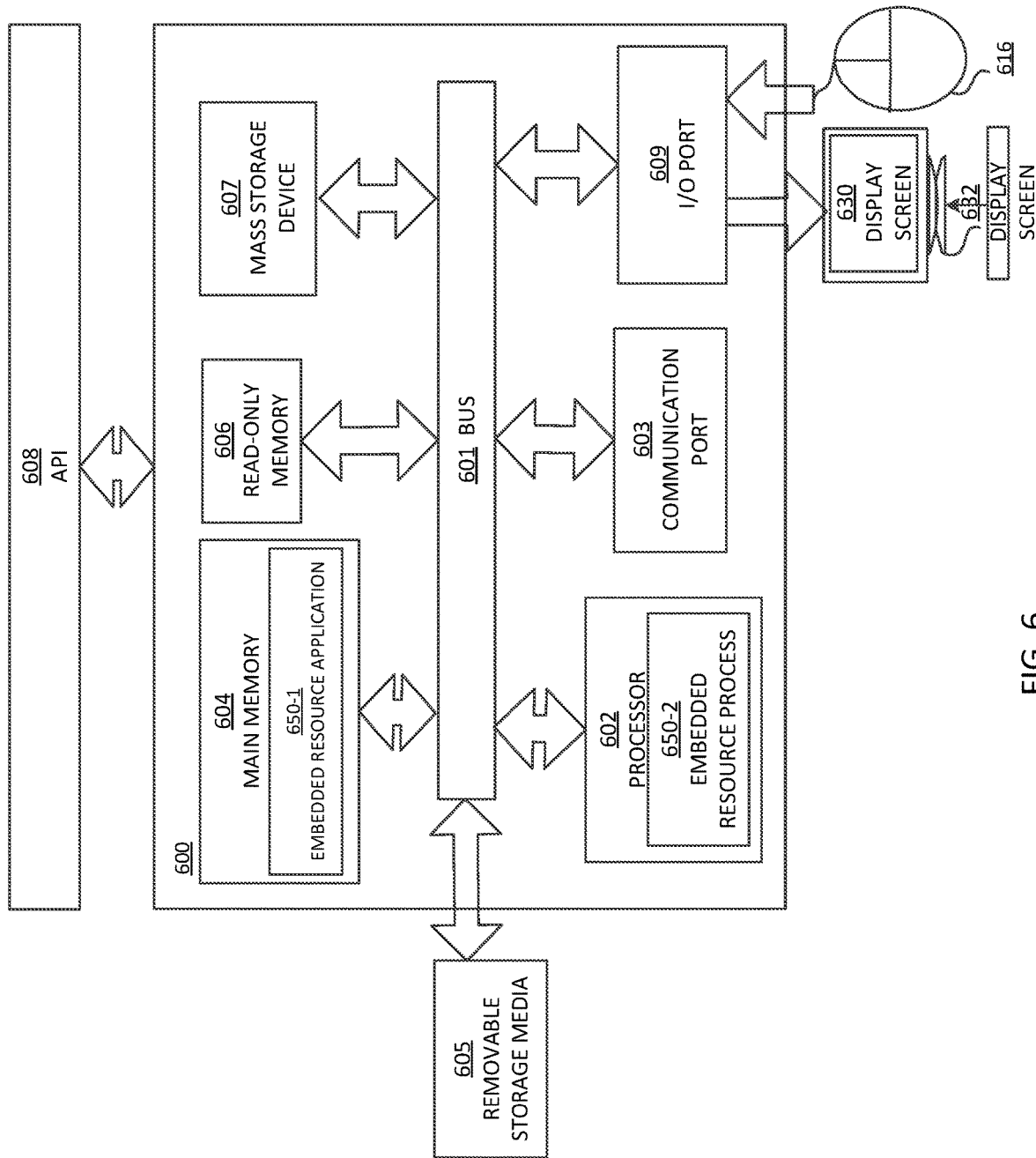
FIG. 6 is an example of a computing system that may implement various systems and methods discussed herein.

FIG. 6 is example schematic diagram of a computing system 600 implementing a CDN node compute engine (and API) 608 that may collect the various data discussed herein, receive requests from origin server, a CDN-OS, or otherwise and process the data and request to determine an optimal CDN node. The computing system for the application 608 includes a bus 601 (i.e., interconnect), at least one processor 602 or other compute element, at least one communication port 603, a main memory 604, a removable storage media 605, a read-only memory 606, and a mass storage device 607. Processor(s) 602 can be any known processor, such as, but not limited to, an Intel® Itanium® or Itanium 2® processor(s), AMD® Opteron® or Athlon MP® processor(s), or Motorola® lines of processors. Communication port 603 can be any of an RS-232 port for use with a modem based dial-up connection, a 10/100 Ethernet port, a Gigabit port using copper or fiber, or a USB port. Communication port(s) 603 may be chosen depending on a network such as a Local Area Network (LAN), a Wide Area Network (WAN), or any network to which the computer system 600 connects. The rendezvous application may be in communication with peripheral devices (e.g., display screen 630, input device 616 via Input/Output (I/O) port 609).

Main memory 604 can be Random Access Memory (RAM) or any other dynamic storage device(s) commonly known in the art. Read-only memory 606 can be any static storage device(s) such as Programmable Read-Only Memory (PROM) chips for storing static information such as instructions for processor 602. Mass storage device 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 601 communicatively couples processor(s) 602 with the other memory, storage and communications blocks. Bus 601 can be a PCI/PCI-X, SCSI, or Universal Serial Bus (USB) based system bus (or other) depending on the storage devices used. Removable storage media 605 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions As shown, main memory 604 is encoded with an embedded resource application 650-1, which may include functionality described relative the API/compute engine discussed herein and that supports functionality as discussed above and as discussed further below. For example, in one embodiment, the application 650-1 may include or otherwise implement the various processes and/or instructions described herein. The application 650-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 602 accesses main memory 604 via the use of bus 601 in order to launch, run, execute, interpret or otherwise perform the logic instructions of the 650-1.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   at least one processor;
   memory, operatively connected to the at least one processor and storing instructions that, when executed by the at least one processor, cause the system to perform a method, the method comprising:
   receiving, by an origin system, a request from a client device for a content resource, the content resource including at least one embedded resource with a tag;
   upon identification of the tag, using at least one delivery parameter to obtain, by the origin system, a modified embedded resource from a content delivery network that is separate from the origin system; and
   delivering, by the origin system, the content resource to the client device with the modified embedded resource, wherein the modified embedded resource includes a direct link to a node within the content delivery network that can deliver content associated with the embedded resource.

2. The system of claim 1, wherein the request is received over an http connection and the at least one delivery parameter includes an IP address of the client device, and wherein the method further comprises:
   passing information based on the client IP address to an application programming interface (API) of the content delivery network;
   in association with the API, obtaining a parameter associated with the embedded resource; identifying, based on the IP address and the parameter, location information for the node in the content delivery network that can serve the content associated with the embedded resource; and
   generating the modified embedded resource to include the direct link to the node.

3. The system of claim 2, wherein the parameter is a popularity parameter.

4. The system of claim 2, wherein the parameter is a delivery protocol parameter.

5. The system of claim 2, wherein the information is the IP address.

6. The system of claim 2, wherein the information is geographic information.

7. The system of claim 2, wherein the location information includes at least one of an IP address, a virtual IP address, one or more absolute uniform resource locators.

8. The system of claim 1, wherein the tag is a unique tag.

9. The system of claim 1, wherein the request is over a hypertext transfer protocol (HTTP) connection and the at least one delivery parameter is a location identifier for the client device, the method further comprising: passing, by the origin system, the location identifier to an application programming interface (API) of the content delivery network to generate the modified embedded resource relating to the node.

10. The system of claim 1, wherein the content resource is a hypertext markup language (HTML) document and the embedded resource is a link.

11. A system within a content delivery network comprising:
- at least one processor;
- memory, operatively connected to the at least one processor and storing instructions that, when executed by the at least one processor, cause the system to perform a method, the method comprising:
  - receiving, from an origin system that is separate from the content delivery network, an embedded resource and at least one parameter associated with the embedded resource;
  - generating a modified embedded resource providing a direct link to a node within the content delivery network for obtaining content associated with the embedded resource;
  - delivering, by the content delivery network, the modified embedded resource to the origin system;
  - receiving, at the node, a request from a client device to obtain the content; and
  - providing the content to the client device.

12. The system of claim 11, wherein the method further comprises replacing the embedded resource with the modified embedded resource in a resource.

13. The system of claim 11, wherein the resource is an HTML document and the modified embedded resource is a link.

14. The system of claim 11, wherein the modified embedded resource includes at least one of an IP address to facilitate communication with the node to obtain the content associated with the embedded resource, a virtual IP address to facilitate communication with the node to obtain the content associated with the embedded resource, or one or more absolute uniform resource locators to facilitate communication with the node to obtain the content associated with the embedded resource.

15. The system of claim 11, wherein the method further comprises providing an application programming interface (API), and wherein the embedded resource is received at the API.

16. A method comprising:
- receiving, at a content delivery network and from an origin system that is separate from the content delivery network, an embedded resource and at least one parameter associated with the embedded resource;
- generating a modified embedded resource providing a direct link to a node within the content delivery network for obtaining content associated with the embedded resource;
- delivering, by the content delivery network, the modified embedded resource to the origin system;
- receiving, at the node, a request from a client device to obtain the content; and
- providing the content to the client device.

17. The method of claim 16, further comprising replacing the embedded resource with the modified embedded resource in a resource.

18. The method of claim 16, wherein the resource is an HTML document and the modified embedded resource is a link.

19. The method of claim 16, wherein the modified embedded resource includes at least one of an IP address to facilitate communication with the node to obtain the content associated with the embedded resource, a virtual IP address to facilitate communication with the node to obtain the content associated with the embedded resource, or one or more absolute uniform resource locators to facilitate communication with the node to obtain the content associated with the embedded resource.

20. The method of claim 16, further comprising providing an application programming interface (API), and wherein the embedded resource is received at the API.

* * * * *